(12) United States Patent
Ruetz

(10) Patent No.: US 12,151,304 B2
(45) Date of Patent: Nov. 26, 2024

(54) METHOD FOR PROCESSING OF TUBES BY CUTTING IN A LASER TUBE CUTTING MACHINE AND LASER TUBE CUTTING MACHINE

(71) Applicant: TRUMPF WERKZEUGMASCHINEN SE + CO. KG, Ditzingen (DE)

(72) Inventor: Karsten Ruetz, Ludwigsburg (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 913 days.

(21) Appl. No.: 17/268,629

(22) PCT Filed: Sep. 2, 2019

(86) PCT No.: PCT/EP2019/073323
§ 371 (c)(1),
(2) Date: Feb. 16, 2021

(87) PCT Pub. No.: WO2020/057951
PCT Pub. Date: Mar. 26, 2020

(65) Prior Publication Data
US 2021/0354233 A1    Nov. 18, 2021

(30) Foreign Application Priority Data

Sep. 17, 2018 (DE) .......................... 102018122717.5

(51) Int. Cl.
*B23K 26/00* (2014.01)
*B23K 26/08* (2014.01)
(Continued)

(52) U.S. Cl.
CPC ...... *B23K 26/0093* (2013.01); *B23K 26/0823* (2013.01); *B23K 26/0861* (2013.01); *B23K 37/0435* (2013.01); *B23P 23/02* (2013.01)

(58) Field of Classification Search
CPC . B23K 26/0093; B23K 37/0435; B23P 23/02; B23Q 1/766; B23Q 3/064; B23Q 7/001; B21D 43/85
See application file for complete search history.

(56) References Cited

U.S. PATENT DOCUMENTS 8,735,774 B2   5/2014   Kosmowski
9,796,103 B2   10/2017  Durst et al.
(Continued)

FOREIGN PATENT DOCUMENTS

CN   102349147 A   2/2012
CN   102922146 A   2/2013
(Continued)

OTHER PUBLICATIONS

Machine translation of CN-20739432-U, Dec. 2023.*
Machine translation of WO-2017174283-A1, Dec. 2023.*

*Primary Examiner* — Geoffrey S Evans
(74) *Attorney, Agent, or Firm* — Laurence A. Greeenberg; Werner H. Stemer; Ralph E. Locher

(57) ABSTRACT

A laser tube cutting machine for the cutting processing of tubes with a workpiece moving device, which receives the tube and moves it relative to a push-through device supporting the tube, which is guided by clamping jaws of the push-through device. A laser machining device is associated with the push-through device and has a processing head which directs a laser beam emerging from the processing head onto the tube. A tool of a processing device mechanical processes the tube, which tool is moveable in at least one direction of movement relative to the tube. At least one counterholder is movable into a working position for abutting against the tube, which counterholder acts in the opposite direction to the direction of application of force of the tool.

20 Claims, 3 Drawing Sheets

(51) Int. Cl.
*B23K 37/04* (2006.01)
*B23P 23/02* (2006.01)

(56) References Cited

U.S. PATENT DOCUMENTS

| | | | |
|---|---|---|---|
| 9,902,030 B2 | 2/2018 | Amaya et al. | |
| 2010/0264121 A1* | 10/2010 | Dilger | B23Q 1/76 |
| | | | 29/27 R |
| 2011/0060444 A1* | 3/2011 | Becker | B23K 26/38 |
| | | | 700/106 |
| 2013/0020295 A1 | 1/2013 | Schopf et al. | |
| 2015/0020372 A1* | 1/2015 | Linder | B23Q 3/08 |
| | | | 29/559 |
| 2019/0030649 A1 | 1/2019 | Ruetz et al. | |
| 2019/0193132 A1 | 6/2019 | Schenk et al. | |

FOREIGN PATENT DOCUMENTS

| | | | |
|---|---|---|---|
| CN | 203621737 U | | 6/2014 |
| CN | 105102192 A | | 11/2015 |
| CN | 207239432 U | * | 4/2018 |
| CN | 108000198 A | | 5/2018 |
| DE | 102004020945 B3 | | 1/2006 |
| DE | 102015115456 A1 | | 3/2017 |
| DE | 102016104107 A1 | | 9/2017 |
| DE | 102016106067 A1 | | 10/2017 |
| DE | 102016221227 A1 | | 5/2018 |
| EP | 2548691 A1 | | 1/2013 |
| JP | S4821111 Y1 | | 6/1973 |
| JP | S62173129 A | | 7/1987 |
| JP | 2015217488 A | | 12/2015 |
| JP | 2018134666 A | | 8/2018 |
| WO | WO-2017174283 A1 | * | 10/2017 ........... B21C 37/298 |

* cited by examiner

METHOD FOR PROCESSING OF TUBES BY CUTTING IN A LASER TUBE CUTTING MACHINE AND LASER TUBE CUTTING MACHINE

BACKGROUND OF THE INVENTION

Field of the Invention

The invention relates to a method for the cutting processing of tubes in a laser tube cutting machine and to a laser tube cutting machine, in particular for carrying out the method.

A laser tube cutting machine and a method for cutting tubes in such a laser tube cutting machine are known from DE 10 2016 106 067 A1. This laser tube cutting machine comprises a workpiece moving device by which a tube to be processed is held and moved relative to a push-through device supporting the tube. A laser processing device is provided adjacent to the push-through device in a workspace. This comprises a processing head through which a laser beam is directed onto the tube. In the workspace adjacent to the laser processing device, a tool holder is also provided to accommodate a tool for mechanical processing of the tube. This tool is moved in an axis of movement perpendicular to the longitudinal axis of the tube, along which it can be moved relative to the push-through device, towards the tube for mechanical processing. During machining of the tube, it is held by clamping jaws of the push-through device. These clamping jaws have a resilience when a preset clamping force is exceeded, which is not exceeded during laser machining, since no forces occur that have to be absorbed by the push-through device. During mechanical processing, higher forces can occur which exceed the preset clamping force of the clamping jaws. Due to the resilience of at least one clamping jaw, this can lead to a positional offset of the tube within the push-through device and impair mechanical processing or make it impossible.

EP 2 548 691 A1 describes a machining device for processing tubes. This machining device comprises a catching lance with a catching opening, which is inserted into the tube to be processed during processing of the tube and the catching opening of the catching lance is positioned below the machining point.

DE 10 2016 104 107 A1 provides a workpiece support which is positioned between a workpiece moving device for receiving and displacing the tube and a push-through device in a processing machine for the cutting processing of tubes. An analogous device emerges from CN 203621737 U.

A device for clamping workpieces is known from DE 10 2016 221 227 A1, which is provided for a workpiece moving device that receives a tube to be processed and by which the tube to be processed can be moved relative to a push-through device.

JP 62-173 129 A discloses a machine for machining pipes. This clamping device has a chuck through which the tube is firmly clamped. Any lateral force caused by the mechanical processing is absorbed by the clamping force of the chuck. During the mechanical processing of the tube, for example during the insertion of a thread on an outer side of the tube, a vibration damping device is additionally applied to an inner side of the tube in order to increase the machining quality.

SUMMARY OF THE INVENTION

The invention is based on the object to propose a method for processing tubes in a laser tube cutting machine as well as a laser tube cutting machine, whereby an additional mechanical processing of the tube with a tool is possible in addition to the laser processing.

This object is solved by a method for the cutting processing of tubes in a laser tube cutting machine, in which the tube is mechanically processed with a tool in addition to the laser machining and at least one counterholder is moved with the tool into a working position for contact with the tube before the mechanical processing of the tube begins. This counter holder, which is moveable into the working position, is used to provide support for the tube, which counteracts the introduction of force by the tool during mechanical processing. The counter holder can absorb forces, which cannot be absorbed by the clamping jaws of the push-through device. As a result, both ablative or cutting processing of the tube by means of the laser beam and mechanical processing of the tube by means of the at least one tool can be carried out sequentially in the laser tube cutting machine. Preferably, machining operations such as machining, flow drilling, furrowing, broaching, grinding, brushing, thread cutting or the like can be performed.

Furthermore, the at least one counterholder is held stationary in the working position. Irrespective of the force applied to the tube by the tool, the counter-support absorbs the forces during machining without a resilience.

Another preferred embodiment of the method provides that the counterholder is transferred to the working position for abutment against an outside surface of the tube. This allows easy feeding from the outside into the working position and into a rest position when not in use.

Furthermore, the tool for mechanical processing of the tube is fed from the outside against the tube. Thus, the counterholder as well as the processing forces exerted by the tool during mechanical processing each act on the tube from an outer side.

A further preferred embodiment of the process provides that the counter holder is positioned in a rest position remote from the tube during laser processing of the tube and is transferred to the working position for contact with the tool before mechanical processing of the tube. This prevents any contamination of the counter holder against burn-off, slag or the like during laser cutting.

In the case of uniaxial force application to the tube by the processing operation, a counterholder which counteracts at least the uniaxial force application is preferably moved into the working position. The tube can be processed without positional offset. The counterholder can directly absorb the reaction force of the tube.

For easy control and force application of the tool to the tube as well as for absorption of the reaction force by the counterholder, the counterholder and the tool are preferably moved in the same axis of movement. According to a preferred embodiment, this axis of movement is perpendicular to the longitudinal axis of the tube.

In the case of a biaxial force application by the tool during the machining of the tube on the tube, a counterholder with a gripping device additionally provided on the counterholder is preferably moved into the working position relative to the tube. The counter holder preferably acts against a first direction of force introduction by the tool. The gripping device preferably counteracts a second direction of force introduction perpendicular to the first direction of force introduction of the tool, so that the tube is secured against deflection in two axes—i.e. against the first and second direction of force introduction—by the counterholder and the gripping device. The first force application direction and the second force application direction are preferably aligned perpendicular to the longitudinal axis of the tube.

A further preferred embodiment of the method provides that the counterholder and/or the gripping device each comprise at least one pressure piece. In this way, a secure contact and absorption of the reaction force can be achieved during mechanical processing by the tool.

Advantageously, the gripping device has two opposing pressure pieces, which are moved in opposite directions towards each other into the working position for contact with the outside of the tube. This allows a clamping function to be exerted on the tube to secure the initial position of the tube defined by the push-through device for subsequent mechanical processing.

Furthermore, preferably during mechanical processing of the tube, in particular when the tube is in a stationary processing position in the workspace, the pressure piece has a point-shaped, planar or rolling support. Alternatively, rolling pressure pieces can be transferred to the counterholder and/or the gripping device for contact with the tube. These rolling pressure pieces, which can be formed by rollers, balls, rolls or the like, are used in particular for mechanical processing of the tube, in which a traversing movement of the tube along its longitudinal axis is also superimposed.

The object underlying the invention is further solved by a laser tube cutting machine for the processing of tubes by cutting, which comprises a workpiece supporting device which receives the tube and moves relative to a push-through device supporting the tube, which guides the tube by means of clamping jaws of the push-through device, and with a laser processing device, which has a processing head which directs a laser beam emerging from the processing head onto the tube, and having at least one additional tool for mechanical processing of the tube, which tool is moveable in at least one direction of movement relative to the tube, at least one counterholder being movable into a working position for abuting against the tube, which working position acts in the opposite direction to the direction of application of force of the tool. This enables a simple support of the tube during the introduction of forces by the mechanical processing by means of the tool onto the tube.

Furthermore, the counterholder preferably has a drive, which transfers the counterholder into the working position and a rest position. This allows the counterholder to be positioned as required to contact and support the tube. In particular, during laser cutting processing, the counterholder is moved to a rest position away from the tube. The drive may include a pneumatic or hydraulic cylinder, an electric linear actuator, or the like for controlling the traversing movement. Also, the drive may include an integral lateral guide. In addition, the drive may be clamped or secured in an extended position. The counter holder thus forms a fixed, non-yielding abutment.

The counter holder preferably has at least one pressure piece, which has a point-shaped, linear, planar or rolling support. The design of the pressure pieces can also depend on the geometry of the tubes.

Preferably, the pressure piece is made of an elastic material. This enables scratch-free positioning of the counterholder on the tube to be processed.

According to a preferred embodiment, the counterholder can additionally have a gripping device which, in contrast to the counterholder, which absorbs a first reaction force, counteracts a second reaction force. Particularly in the case of biaxial force application during mechanically processing, such as milling, this enables the tube to be held securely. In the case of biaxial force application, the first reaction force can be counteracted by the counterholder and the second reaction force can be counteracted by the gripping device.

Preferably, the gripping device for absorbing the second reaction force of the tube acts perpendicularly to the counterholder that absorbs the first reaction force.

For positioning the gripping device on the tube, two opposing pressure pieces are preferably provided, which are positioneable relative to the tube with a clamping force acting on the tube. On the one hand, this allows simple adaptation to different cross-sections of the tube to be processed. On the other hand, a sufficient clamping force can be applied via the gripping device without causing deformation of the tube.

Preferably, the pressure pieces of the gripping device are moveable by a drive. This drive can be sensor-controlled so that a clamping force adjusted by the tube can be set.

The invention and other advantageous embodiments and further embodiments thereof are described and explained in more detail below with reference to the examples shown in the drawings. The features to be taken from the description and the drawings can be applied individually or in any combination in accordance with the invention.

DETAILED DESCRIPTION OF THE INVENTION

Figure 1:
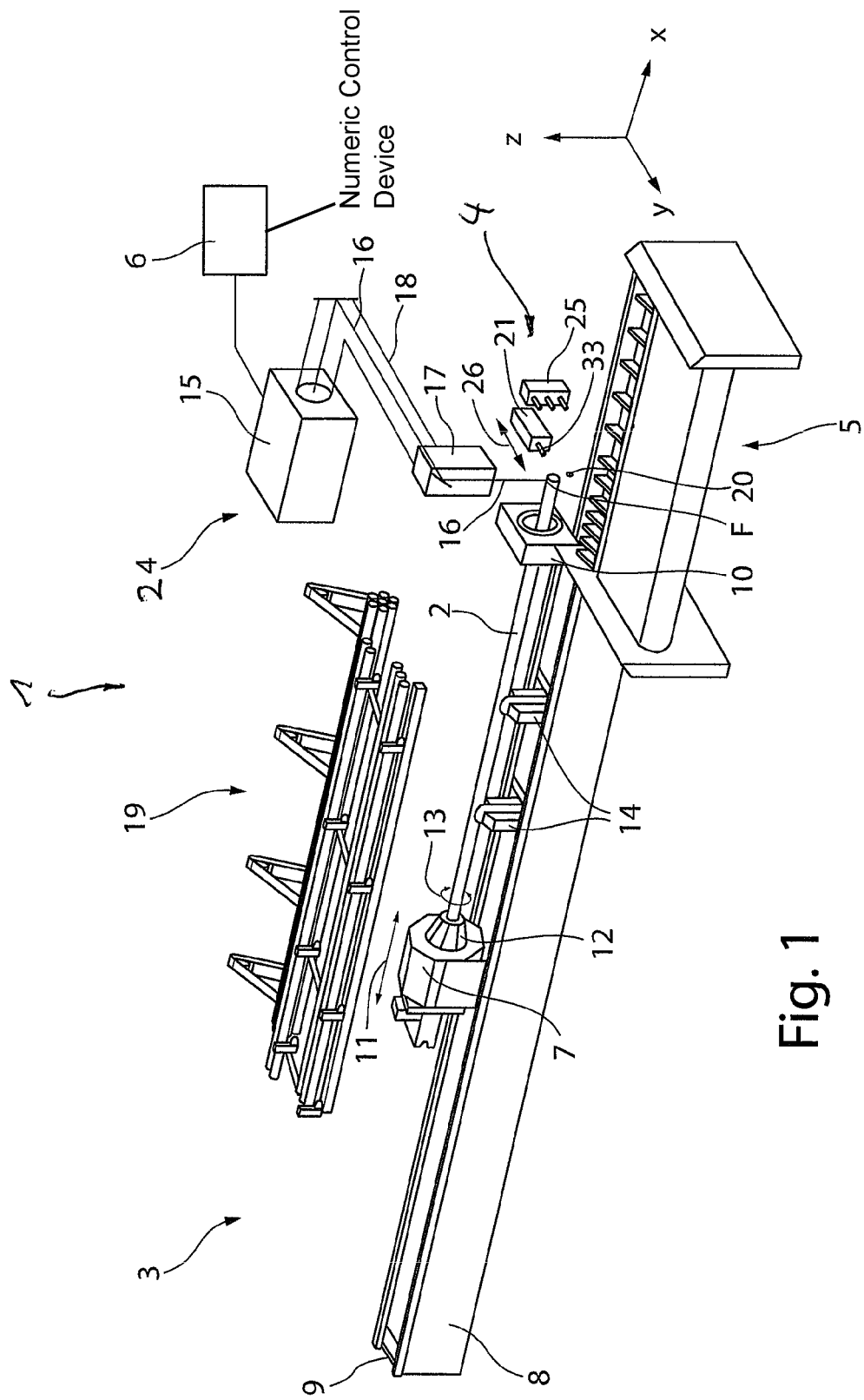
FIG. 1 a perspective view of a laser tube cutting machine,
FIG. 2 a schematic side view of a push-through device with a mechanical tool and a counterholder,
FIG. 3 a schematic view from above of the push-through device according to FIG. 2,
FIG. 4 a schematic side view of an alternative embodiment of the counterholder to FIG. 2, and
FIG. 5 a schematic side view of a further alternative embodiment of the counterholder to FIG. 2.

FIG. 1 shows a schematically simplified laser tube cutting machine 1. This laser tube cutting machine 1 is intended for the cutting processing of workpieces 2, wherein the workpieces 2 are rod-shaped, in particular tubular. In particular, however, profiles are also to be understood as rod-shaped. This laser tube cutting machine 1 comprises a feeding device 3 for laterally feeding the tube 2 to be cut to the laser tube cutting machine 1, for example by a loading device 19. This feeding device 3 feeds the tube 2 to be cut to a workspace 20. In this workspace 20, the tube is processed by a laser machining device 24 for laser cutting of the tube 2, in particular of rod sections or tube parts and/or by a processing device 4, for mechanical processing with a tool 33. The finished processed tubes 2, rod sections or tube parts are received by an unloading device 5 and discharged from the laser tube cutting machine 1. All essential functions of the laser tube cutting machine 1 are controlled by a numerical control device 6.

The feeding device 3 comprises a rotary and feed device serving as workpiece moving device 7 as well as a machine bed 8 with guide rails 9 and a push-through device 10. The workpiece moving device 7 is motor-driven and can be moved in feed direction 11 on the guide rails 9. The tube 2 to be fed is fixed by a clamping device 12 of the workpiece moving device 7, which is rotatable in the direction of the double arrow 13 and encloses the fed tube 2 from the outside and clamps it stationarily. The tube 2 is supported by at least one workpiece support 14 integrated in the machine bed 8 during the feed to the push-through device 10 and/or during the processing of the tube 2. In the area of the processing device 4, the workpiece 2 is guided through and supported by the push-through device 10. The push-through device 10 is designed in such a way that the clamped tube 2 is guided in the feed direction and is not clamped in a fixed position. The tube 2 is rotatable in the push-through device 10 about the axis of rotation 13.

The laser machining device 24 includes a laser beam source 15 for generating a laser beam 16, a processing head 17, and a beam guide 18 that guides the laser beam 16 from the laser beam source 15 to the processing head 17. The laser beam 16 exits the processing head 17 and is focused onto the outer circumferential surface of the tube 2 at a processing location F within the workspace 20.

Associated with the workspace 20 and/or adjacent to the machining head 17 is a tool holder 21 of the processing device 4, which can be moved by means of a guide 22 (FIG. 2) at least within the workspace 20, so that the tool holder 21 with a tool 33 clamped therein can be moved to the processing point F and in turn removed from it.

A magazine 25 can also be provided at a distance from the processing point F. This magazine 25 can be designed, for example, as a linear magazine or turret magazine. Various tools 33, such as drills, flow drills, tapping tools or thread forming tools, can be stored in this magazine 25. The tool holder 21 is preferably movable in the Y-direction according to the double arrow 26 shown, at least between the magazine 25 and the processing point F. For the use of a linear magazine 25, the tool holder 21 can furthermore be movable in the Z direction. Alternatively, the magazine 25 can also be movable in the Z direction.

On the side of the push-through device 10 facing away from the machine bed 8, the unloading device 5 is provided, which discharges workpiece parts or sections cut from the tube 2 as well as a residual workpiece from the laser tube cutting machine 1.

Figure 2:
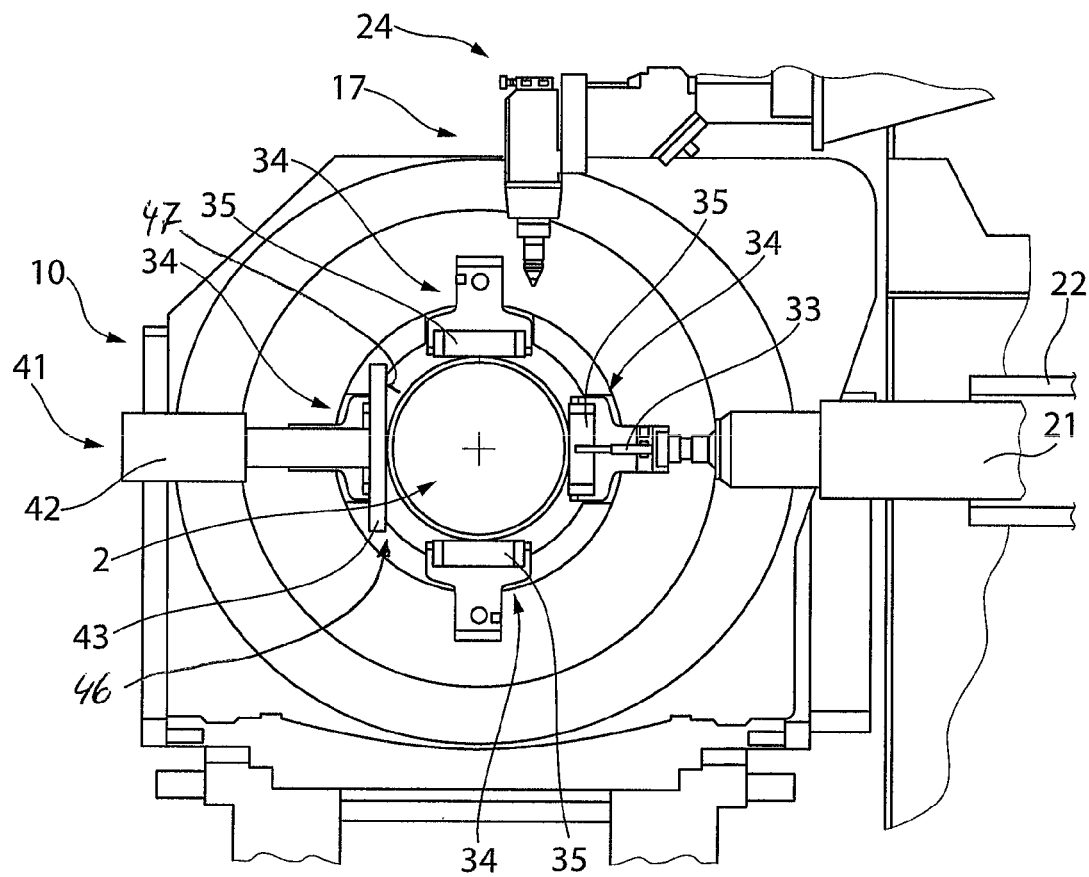

FIG. 2 shows a schematic side view of the push-through device 10. The push-through device 10 comprises a plurality of clamping jaws 34, which are accommodated resiliently in the push-through device 10. For example, four clamping jaws 34 are provided, which are arranged in pairs opposite one another and offset by 90° with respect to one another. The clamping jaws 34 can be adjustable with respect to their clamping force. These clamping jaws 34, which preferably have rollers 35 that rest against the tube 2, can be used to guide the tube 2 for laser cutting processing.

A counterholder 41 is provided in the workspace 20. This counterholder 41 comprises a drive 42 by means of which a pressure piece 43 of the counterholder 41 can be moved into a working position 46 shown in FIG. 2. In this working position 46, the pressure piece 43 rests against an outer side of the tube 2. In a rest position not shown in more detail, the pressure piece 43 is positioned away from the tube 2. Preferably, the positioning of the pressure piece 43 into the working position 46 and the rest position remote therefrom is effected by a traversing movement along a Y-axis. This traversing movement is controlled by the drive 42. The drive 42 can be provided by a pneumatic, hydraulic cylinder. Also, an electric linear actuator or the like may be provided. The counter holder 41 is controlled by the control device 6.

According to a first embodiment, the pressure piece 43 can be formed as a surface or plate-shaped. Preferably, a contact surface 47 of the pressure piece 43 may be formed of an elastic material, in particular plastic, in order to avoid pressure points or scratches. Alternatively, the pressure piece 43 can also have a curved, a circular or V-shaped edge in the direction of the tube 2.

The tool 33 is shown in FIG. 2 in a position just before it engages the tube 2 for processing. When a hole is drilled, the tool 33 is moved along the X axis towards the outside of the tube 2. This causes a uniaxial force to act, particularly in the Y direction. The counterholder 41 counteracts this uniaxial force introduction by a first reaction force. As a result, the tube 2 can be held in the guided position by the push-through device 10 when a force is introduced by the tool 33 that is greater than the clamping force of the clamping jaw 34. The counterholder 41 may be fixedly positioned in the working position 46. For example, the cylinder may have an integrated clamping or locking function for this purpose.

Figure 3:
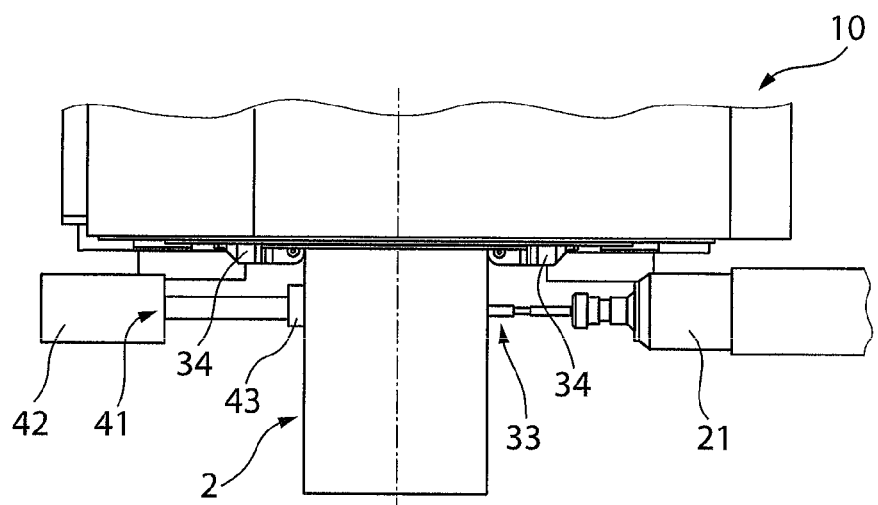

FIG. 3 shows a schematic view of the push-through device 10 with the tool 33 and the counterholder 41 positioned relative to the tube 2. The counterholder 41 engages the outside of the tube 2. The tool 33 is fed opposite likewise to the outside of the tube 2. This arrangement has the advantage that there is no restriction of the tube length when processing the tube 2, such as by a supporting lance, which has to be positioned inside the tube.

Figure 4:
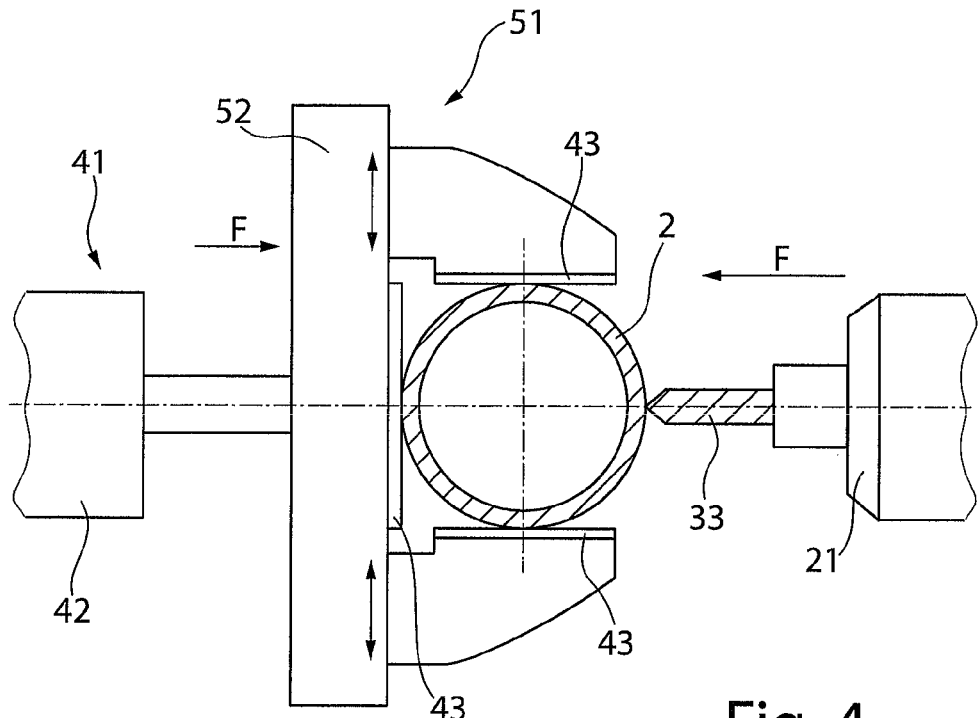

FIG. 4 shows a schematic side view of an alternative embodiment of the counterholder 41. In addition to a pressure piece 43, which counteracts a first direction of force application, this counterholder 41 has a gripping device 51. This gripping device 51 forms a second reaction force, which counteracts a further direction of force introduction, for example in the Z direction. In the case of mechanical processing with a two-axis force introduction, for example in the case of milling, a second force introduction direction, which is perpendicular to the first force introduction direction, can additionally be counteracted.

The gripping device 51 has, for example, two opposing pressure pieces 43. These opposing thrust pieces 43 can be moved towards each other by an actuator 52 in order to engage the outside of the tube 2. As a result, with the pressure piece 43 as a counter support 41, a three-point support is provided on the tube 2. Thus, the tube 2 can be held in a defined position in the Y-direction and in the Z-direction when force is applied by the tool 33. A force application by the tool 33 in the X direction is absorbed by the workpiece moving device 7, since the tube 2 is stable under pressure and tension.

A clamping function can be controlled by the actuator 52 of the gripping device 51. This clamping function acting on the tube 2 can be greater than the preset clamping force of the clamping jaws 34. The adjustable clamping force is adapted to the inherent rigidity of the tube 2 in order to avoid deformation of the tube 2.

The pressure pieces 43 of the gripping device 51 can be designed analogously to the pressure piece 43 of the counterholder 41.

Figure 5:
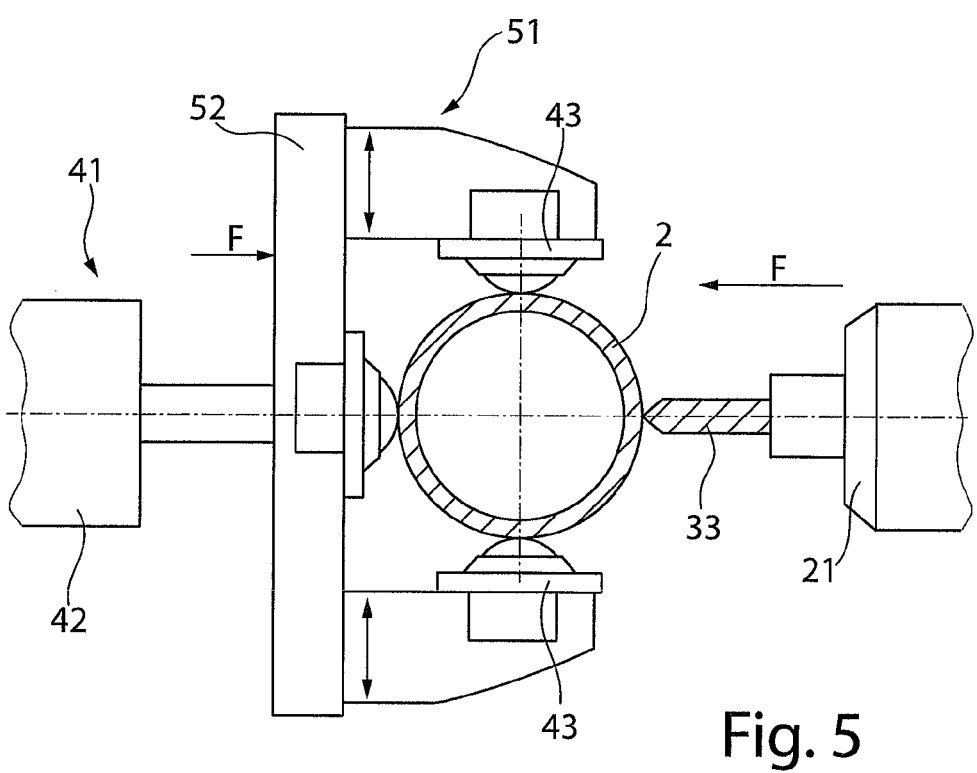

FIG. 5 shows an alternative embodiment of the counterholder 41 with the gripping device 51 to FIG. 4. This embodiment differs in the design of the pressure pieces 43. In the embodiment according to FIG. 5, the pressure pieces 43 are formed by rotatably mounted balls or rollers. This has the advantage that during mechanical processing by the tool 33, the tube 2 can additionally be moved along the longitudinal axis of the tube 2, in particular in the X direction, by the workpiece moving device 7. In this way, friction-minimized guidance can be achieved. Alternatively, non-rolling pressure pieces can also be provided, which have a material with high sliding properties for support.

The invention claimed is:

1. A method for processing tubes by cutting in a laser tube cutting machine, which comprises the steps of:
 holding a tube to be processed by a workpiece moving device and the tube being moved in an X-direction relative to a push-through device supporting the tube;
 processing the tube via a laser machining device and during laser machining the tube is guided by clamping jaws of the push-through device in Y and Z-directions and held with a clamping force;
 further mechanically processing the tube with a tool of a processing device, the tool being moved in at least one axis of movement relative to the tube; and
 moving at least one counterholder, before a start of the mechanical processing of the tube, with the tool into a working position for abutting against the tube.

2. The method according to claim 1, which further comprises holding stationary the at least one counterholder in the working position.

3. The method according to claim 1, which further comprises transferring the at least one counterholder to abut against an outer side of the tube and taking the working position.

4. The method according to claim 1, which further comprises feeding the tool for the mechanical processing of the tube from an outside against the tube.

5. The method according to claim 1, wherein the at least one counter holder is positioned in a rest position remote from the tube during the laser machining of the tube and is transferred to the working position for abutment against the tube before the mechanical processing of the tube with the tool.

6. The method according to claim 1, wherein in a case of uniaxial force application to the tube by the mechanical processing with the tool, the counterholder counteracting at least the uniaxial force application is moved into the working position.

7. The method according to claim 6, wherein the counterholder and the tool are moved in a same axis of movement and each in an opposite direction to an outside of the tube.

8. The method according to claim 1, wherein in a case of a biaxial application of force to the tube by the mechanical processing with the tool, the counterholder and a gripping device additionally provided on the counterholder are moved into the working position relative to the tube, the counterholder absorbing a first reaction force and the gripping device absorbing a second reaction force.

9. The method according to claim 8, wherein the counterholder absorbing the first reaction force and the gripping device absorbing the second reaction force, perpendicular to the first reaction force of the counterholder.

10. The method according to claim 8, wherein the counterholder and/or the gripping device each contain at least one pressure piece.

11. The method according to claim 10, wherein the gripping device contains two opposing pressure pieces which are moved in opposite directions into the working position for abutment against an outer side of the tube.

12. The method according to claim 10, wherein during the mechanical processing of the tube with a uniaxial or biaxial application of force by the tool, punctiform, linear or planar pressure pieces are transferred for abutment against the tube.

13. The method according to claim 10, wherein during a mechanical processing of the tube, rolling pressure pieces are transferred for abutment against the tube.

14. A laser tube cutting machine for processing of tubes by cutting, the laser tube cutting machine comprising:
 a push-through device having clamping jaws;
 a workpiece moving device receiving a tube and moving the tube in an X-direction relative to said push-through device, said push-through device supporting the tube when guided in Y and Z-directions by said clamping jaws of said push-through device;
 a laser machining device associated with said push-through device and having a processing head directing a laser beam emerging from said processing head onto the tube;
 a processing device having at least one tool for mechanical processing of the tube, said at least one tool being moveable in at least one direction of movement relative to the tube; and
 at least one counterholder being moveable into a working position for abuting against the tube, said counterholder acting in an opposite direction to a direction of application of force of said at least one tool.

15. The laser tube cutting machine according to claim 14, wherein said counterholder has a drive which transfers said counterholder into the working position and into a rest position.

16. The laser tube cutting machine according to claim 14, further comprising a releasable locking device, said counterholder is secured stationary in the working position by said releasable locking device.

17. The laser tube cutting machine according to claim 14, wherein said counterholder has at least one pressure piece with a point-shaped, linear, planar or rolling support.

18. The laser tube cutting machine according to claim 14, wherein said counterholder has at least one pressure piece made of an elastic material.

19. The laser tube cutting machine according to claim 18, wherein said counterholder has a gripping device which acts differently from a first reaction force of said counterholder or wherein said gripping device receives a second reaction force of the tube, which is oriented perpendicular to the first reaction force of said counterholder.

20. The laser tube cutting machine according to claim 19, wherein said gripping device has at least two opposing pressure pieces which engage the tube with a clamping force and wherein said two opposing pressure pieces of said gripping device are moveable by a drive.

* * * * *